March 16, 1965     H. KLUKOS     3,173,700
FLOATING TOOL HOLDER
Filed Nov. 21, 1962
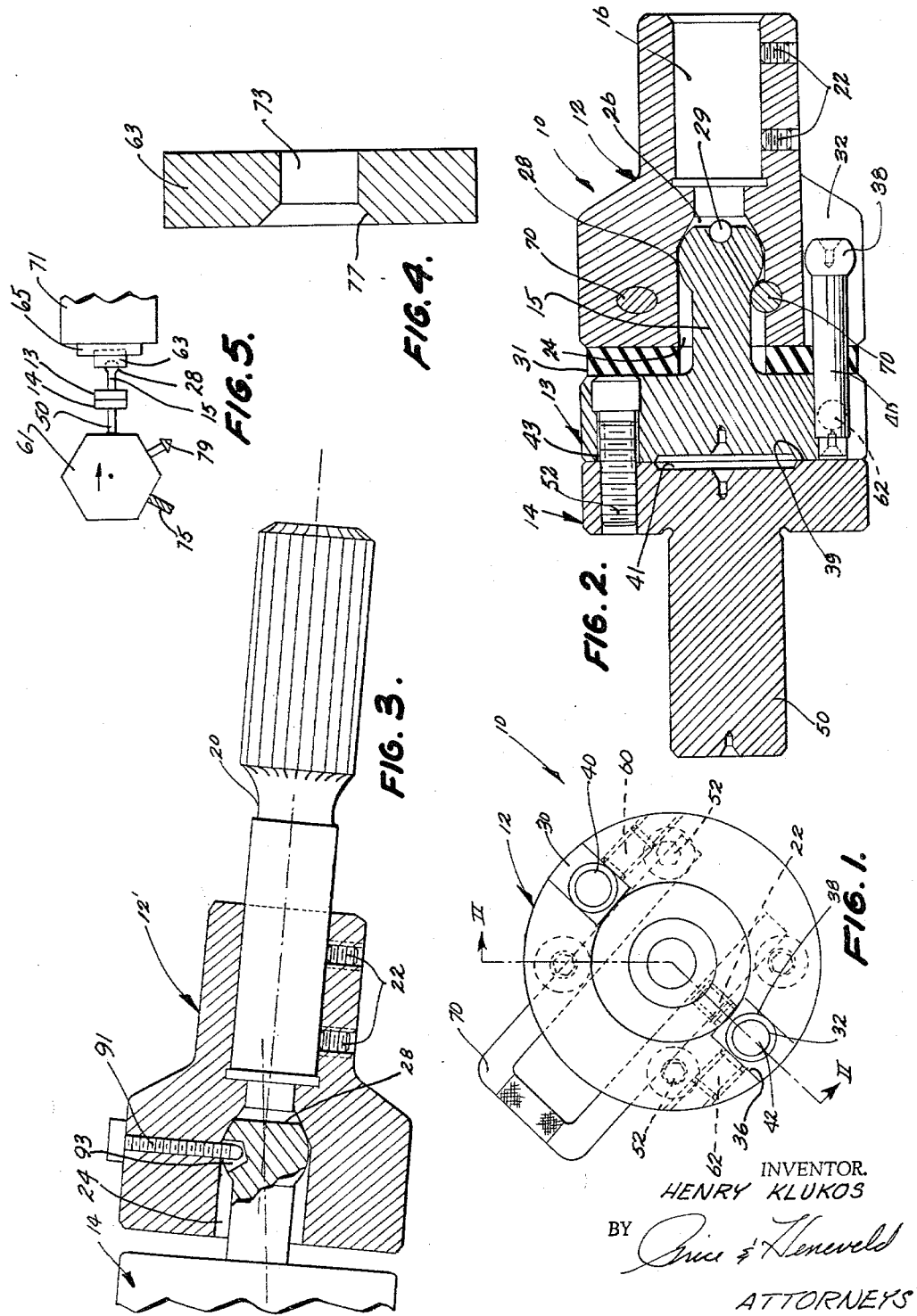
INVENTOR.
HENRY KLUKOS
BY
ATTORNEYS

3,173,700
FLOATING TOOL HOLDER
Henry Klukos, R.R. 1, 15530 Winans St., West Olive, Mich.
Filed Nov. 21, 1962, Ser. No. 239,149
8 Claims. (Cl. 279—16)

This invention relates to a tool holder and more particularly to a tool holder enabling exact, initial axial alignment of a tool with a workpiece, and also continuous angular alignment of the tool with respect to the workpiece during the machining operation.

A problem of obtaining exact alignment of the longitudinal axis of a stationary tool such as a reamer mounted in a turret, with the rotational axis of a drilled hole in a rotating workpiece often occurs. This is usually because of wear on the turret lathe machine parts, inaccurate machine part alignment and other related factors. With rotation of the workpiece and axial feeding of the tool, therefore, a slight initial misalignment of a few thousandths of an inch, for example, produces a marked departure from desired tolerances, usually in the form of a tapered reamed hole. Consequently, perfectly useful tools such as reamers cannot always be used to full advantage. Presently, free floating reamer holders are available which will allow the front end of the holder to move freely transversely of the center line of the holder and tool during operation. However, these have no really accurate way of providing exact initial alignment. Further, the weight of the reamer causes greater wear on the bottom of the hole, thereby creating a slightly elliptical hole.

Several other prior structures comprise two parts having some type of ball or swivel joint therebetween that can be tightened after alignment. Again, these do not provide means for exact initial alignment of the tool with the workpiece. Further, after initial alignment is made by sight or by mashing the front end of the reamer itself against the drilled hole when the joint is loose, the joint is then actually tightened into a rigid condition to prevent the tool and one part of the holder from rotating with the revolving workpiece. This tightening action often throws the holder out of complete alignment again. Further, it does not allow continuous angular adjustment of the reamer to allow it to follow the hole exactly.

It is therefore an object of this invention to provide a tool holder that is separable into parts, with one part having unique means for aligning the tool holder and the tool such as a reamer with the hole in a workpiece. Moreover, the unique aligning means also subsequently serves as part of a swivel joint providing constant correlation of the reamer with the hole during the reaming operation. Simple, rapid separation of the parts allows completely unhindered alignment of the novel tool holder portion with the workpiece. The tool holder is then quickly and easily reassembled in a fraction of a second merely by inserting a sliding key or pin and without disturbing the alignment. Therefore, not only is the exact initial alignment achieved, but it is retained after reassembly of the holder. The dual use of the aligning portion also as part of an accurate swivel joint causes the joint and the front end of the holder and tool to be exactly aligned.

It is another object of this invention to provide a tool holder formed of three functional parts that enable exact center line adjustment to cause the center line of the tool holder and tool to be exactly colinear with that of the workpiece, and also provide constant swivel action in a controlled manner between the workpiece and reamer.

It is another object of this invention to provide a tool holder that does not require tightening of its swivel joint at any time. Rather, an additional rotational holding means is provided to prevent rotation of the tool with the workpiece. This holding means, moreover, does not require tightening to disturb the alignment. Thus, the holder assures that the reamer will follow the drilled hole during the entire operation.

It is another object of this invention to provide a novel tool holder that effectuates all of the above factors simultaneously and does so with a simple, relatively inexpensive structure. The reamed hole is accurate, is not tapered, and is not elliptical in shape. The weight of the reamer does not bear against the bottom of the holder due to a unique resilient bumper means between the elements of the holder. However, the bumper does allow swivel action to enable constant correlation of the reamer with the drilled hole.

These and many other objects of this invention will be apparent upon studying the following specification in conjunction with the drawings in which:

FIG. 1 is an end elevational view of the novel tool holder;

FIG. 2 is a side elevational sectional view of the tool holder in FIG. 1 taken on plane II—II of FIG. 1;

FIG. 3 is a side elevational sectional view of the tool holder with a reamer in place and with a modified rotational holding means and axial retaining means;

FIG. 4 is a side elevational sectional view of a typical workpiece to be reamed; and FIG. 5 is a top plan view of a portion of the separable tool holder in a turret being aligned with the workpiece in a chuck.

Basically, the inventive tool holder includes a first element adapted to receive a tool such as a reamer and having a ball receiving socket, a second element having an axial projection (15) terminating in a ball for aligning the holder by fitting into the drilled hole and also for providing a swivel joint with the first element by fitting into the ball socket of the first element, a third element adapted to fit into a conventional turret hole and being adjustable with respect to said second element in a plane transverse to the center line of the holder, with means for locking it in the adjusted position, axial retention means (70 or 91) between the first and second elements to prevent separation thereof while allowing ball joint action, and rotational holding means (40 and 38 or 91) between the first and second elements preventing rotational action between the elements while allowing ball swivel action. The axial locking means comprises a keeper means, preferably a pin or key, insertable into or behind the extended ball to retain the ball joint connected in one position, and allowing disconnection of the joint when shifted to a second position. The rotational holding means may comprise a plurality of off-center pins extending axially from the second element into longitudinal slots of the first element, or may be the same means as the axial locking means when projecting into the ball. Resilient bumper means between the first and second elements prevents the weight of the reamer from bearing on the lower surface of the drilled hole, while still allowing limited swivel action of the ball joint.

Referring specifically to the drawings, the novel tool holder 10 is essentially composed of three elements 12, 13 and 14. The first front element includes a cylindrical front cavity 16 for receiving a conventional tool such as reamer 20 illustrated in FIG. 3. This tool may be held in place by suitable set screws 22. At the rear of the front element 12 is a cylindrical recess or socket 24 having a tapered inner end 26 adapted to interfit with ball 28. Surface 26 may comprise a frustoconical shape or a hemispherical shape.

A pair of longitudinal slots 30 and 32 are preferably formed in the periphery of element 12 in the modification shown in FIGS. 1 and 2. These slots have a width sufficient to receive ball portion 38 on the axially extending off center rotational holding pins 40 and 42. The radially extending walls 36 of the slots are adapted to engage the balls 38. These pins are secured in cylindrical recesses in middle element 13 by set screws 60 and 62. The second or middle element 13 includes a cylindrical collar, axially and forwardly protruding or extending portion 15 which terminates in a ball or a spherical end 28 interfittable with surface 26 to form a swivel ball joint having an angular universal type action.

The projection 15 and ball 28 serve two important purposes. The first is that of aligning elements 13 and 14 with the hole 73 in a workpiece 63. The second is to form a releasable swivel joint connection with element 12 with the ball serving to locate element 12 on dead center with the hole on which the ball was aligned. Both of these functions will be explained more specifically hereinafter when the operation of the device is described.

In the form of the invention illustrated in FIGS. 1 and 2, a U-shaped locking key or pin 70 is inserted with its legs through transverse openings in element 12 behind the ball 28 to axially lock or retain elements 12 and 13 together.

In the front end of ball 28 is preferably mounted a smaller ball 29 on the center line of the projection for aligning the holder with smaller drilled holes in the workpiece as explained hereinafter. This smaller ball may be held in place by peening over the edge of the opening into which it is placed.

Between the front element 12 and the middle element 13 is an annular resilient shim bumper 31 preferably formed of rubber. The lower side of this resilient bumper normally supports the weight of the reamer 20 mounted in the front of element 12, and the weight of element 12, so that the reamer does not bear against the lower surface of the drilled hole in the workpiece on which it is operated more than on the other surfaces of the hole. This prevents the hole from becoming elliptical in shape due to greater bite of the tool at the hole bottom. Yet, the bumper has sufficient resiliency to allow limited swivel action of the ball joint between ball 28 and socket 24.

The third and rear element 14 includes a front annular face 39 which is ground to a close tolerance to interfit smoothly with the rear annular face of the second element 13. Thus, sliding action between the two faces in a direction transverse to the center line or axis of the tool holder and tool can be smoothly and accurately effected when the plurality (four) set screws 52 which connect these parts rigidly together are loosened. A space 41 is normally machined in the center between these annular surfaces to provide a smaller face area to be accurately ground on a grinder.

The openings 43 through the flange portion of element 13 through which the set screws 52 extend are larger in diameter than the set screws to allow transverse play between the two parts 13 and 14 when the set screws are loosened. These set screws are normally loosened during the alignment step and are tightened thereafter and during operation. Extending rearwardly on the center line of element 14 is a shank 50 adapted to interfit into a conventional turret 61 as on a turret lathe.

*Operation*

In use of the novel tool holder, exact initial alignment is first obtained. This is achieved by first withdrawing the U-shaped pin 70, and removing the front end 12 of the tool holder. A suitable reamer 20 is secured in socket 16 of element 12 by set screws 22. Depending upon the shank size of the reamer, bushings may be necessary. The shank 50 on portion 14 is then inserted in a typical socket in a turret 61 of a lathe as illustrated in FIG. 5. The set screws 52 between elements 13 and 14 are then loosened to allow transverse adjustment therebetween with respect to the center line of the tool holder, tool, machine, and workpiece. The workpiece 63 would normally be in the chuck 65 of the head stock 71 of the lathe at this time since the hole 73 drilled into the workpiece has been drilled on the same machine. This is normally done with a conventional bit 75. The hole is preferably provided with a tapered countersink 77 by a conventional tool 79.

With the workpiece 63 in the chuck 65 in a non-rotating condition, turret 61 is cranked forwardly to place the ball 28 tightly against and partially into the tapered countersink 77, or alternatively directly into the drilled hole 73 of workpiece 63. By forcing the spherical ball tightly against the hole, transverse movement will occur between elements 13 and 14 to cause the center line of shank 15 and the middle element 13 to align exactly with the center line of hole 73 of workpiece 63. Then set screws 52 are tightened to maintain this aligned condition. Next, the turret is backed away from the workpiece, the annular rubber bumper 31 is placed around projection 15, and socket 24 of element 12 is slid over ball 28 and part of projection 15. Pin 70 is inserted to axially lock the ball joint together. When element 12 is connected with element 13, the pins 40 and 42 as well as the ball 38 become placed in the slots 30 and 32. This provides the rotational holding means. Element 12 is now exactly aligned with the hole 73 since it is closely interfitted with and aligned on ball 28 which is on exact dead center.

The device is now ready for reaming since the center lines are exactly colinear even though originally the turret 61 may have been a few thousandths of an inch lower or higher than the head stock due to wear of the elements of the machine. Further, since the ball joint formed between ball 28 and surface 26 is not tightened down, the reamer will continuously follow the center line of the rotating hole all the way through due to a limited angular swivel action occurring therebetween.

*Modification*

Referring to FIG. 3, a modification of the tool holder is there illustrated. In this modification, element 12 does not include the slots 30 and 32 for reception of pins 40 and 42 since both rotational holding means and axial retention means are achieved by the same radially inserted pin 91 which preferably includes a threaded portion for retention purposes. The pin has its inner radial end projecting directly into a narrow recess 93 in the ball 28. This prevents rotation of element 12 when the workpiece is rotated. This same pin also comprises axial locking means since the ball 28 may not be withdrawn from the socket 24 due to this same pin 91 in recess 93. The recess 93 is substantially longer than the terminal end of pin 91 to allow limited swivel action between the ball and its socket, as shown in an exaggerated manner in FIG. 3. Preferably, a rubber bumper means 31 as in FIG. 2 is also included in this form of the invention. The operation of the modified form of the invention is substantially like that described with respect to the modification in FIGS. 1 and 2.

Various advantages in addition to those cited will be apparent to those in the art upon studying the foregoing illustrated form of the invention and the principles behind it. Also, various obvious modifications in the particular structure depicted may readily occur to those in the art to suit a particular situation while adopting the principles and basic structure taught. These obvious modifications are deemed to be part of this invention which is to be limited only by the scope of the appended claims and the reasonably equivalent structures to those defined therein.

I claim:

1. A tool holder comprising: a first element adapted to receive a tool; a second element; a ball joint between said first and second elements; rotational and axial holding means between said elements but allowing swivel action of said ball joint for constant realignment during use and being removable to allow separation of said elements for initial alignment purposes; and a third element adapted to interfit with rotational drive means being secured to said second element and adjustable with respect thereto in a plane transverse to the axis of all three elements.

2. A tool holder comprising: socket means adapted to receive a tool; shank means adapted to be placed in a conventional turret socket; a ball joint between parts of said holder formed between a projection with an enlarged ball head and a cooperative socket receiving said head; an axial retention pin extending generally transversely through said socket to normally hold said ball in said socket while allowing swivel action between said ball and socket, and being shiftable to allow said elements to be readily separated to enable said ball to be used for alignment purposes, and rejoined again; and adjustable portions of said holder movable in a plane transverse to the axis of said holder and adapted to be fixed in the adjusted position.

3. A tool holder comprising: a first element adapted to receive a tool on one end and having a ball receiving socket on the other end; a second element having a projection on one end with an enlarged ball head to interfit with said socket and form a ball joint; shiftable keeper means in said first element cooperating with said ball head to normally retain said head in said socket while allowing swivel action between said elements; a third element connected to said second element on the end opposite said one end and adjustable with respect thereto in a plane transverse to the axis of said holder; said keeper means being shiftable to a position allowing withdrawal of said ball head from said socket and separation of said elements to enable use of said ball to align said holder with the hole in a workpiece by adjustment between said second and third elements; and disconnect rotational holding means between said elements preventing rotation of said tool holder and tool while allowing swivel action of said ball and socket.

4. A tool holder comprising: a first element adapted to receive a tool on one end; a second element having a projection with an enlarged ball head, and said first element having a socket on its end opposite said one end, receiving said head; shiftable keeper means behind said ball head and normally retaining said head in said socket while allowing swivel action between said elements; a third adjustable element attached to said second element and allowing adjustment of the axis of said tool holder and tool; said keeper means being shiftable to a position allowing withdrawal of said ball head from said socket and separation of said elements to enable use of said ball for alignment with a workpiece by adjustment between said second and third elements; and off-center axially-projecting, drive means on one of said elements interfitting with radially extending wall means on the other element allowing constant limited swivel action between said elements during use.

5. A tool holder comprising: a first element adapted to receive a tool; a second element; a ball joint between said first and second elements; rotational and axial holding means between said elements but allowing swivel action of said ball joint and being removable to allow separation of said elements for alignment purposes; resilient bumper means between said first and second elements to prevent ball joint swivel action under the weight of said first element and a tool while still allowing limited swivel action by greater forces during operation; and a third element secured to said second element and adjustable with respect thereto in a plane transverse to the axis of all three elements.

6. A tool holder comprising: a first element adapted to receive a tool on one end and having a ball receiving socket on the other end; a second element having a projection on one end with an enlarged ball head to interfit with said socket and form a ball joint; shiftable keeper means in said first element cooperating with said ball head to normally retain said head in said socket while allowing swivel action between said elements; resilient bumper means between said first and second elements to prevent ball joint swivel action under the weight of said first element and a tool while still allowing limited swivel action by greater forces during operation; a third element connected to said second element on the end opposite said one end and adjustable with respect thereto in a plane transverse to the axis of said holder; said keeper means being shiftable to a position allowing withdrawal of said ball head from said socket and separation of said elements to enable use of said ball to align said holder with the hole in a workpiece by adjustment between said second and third elements; and disconnect rotational holding means between said elements preventing rotation of said tool holder and tool while allowing swivel action of said ball and socket.

7. A tool holder comprising: three elements on an axis; the first element adapted to receive a tool; the first and second elements having an untightenable, separable swivel joint therebetween including means to align said holder on a workpiece; means between the second and third elements allowing adjustment transverse to said axis; and rotational holding means between said elements retaining rotational alignment while allowing said transverse adjustment and swivel joint action.

8. A tool holder comprising: a first element adapted to receive a tool; a second element having an axially-projecting, centrally positioned cylindrical projection having an enlarged, generally spherical head; the first element having a generally cylindrical, axially oriented, centrally positioned socket receiving said head and part of said projection; a removable holding pin extending transversely into said socket to normally retain said head in said recess; the interfit between said head, recess and pin allowing limited swivel action between said elements to enable constant adjustment between the respective axes; resilient bumper means between said first and second elements to prevent ball joint swivel action under the weight of said first element and a tool while still allowing limited swivel action by greater forces during operation; said pin being removable to enable simple disassembly of said elements for alignment purposes, and re-assembly axially extending off-center pin means on one of said elements, and longitudinal slot means on the other element receiving said pin means to prevent rotational movement therebetween; and a third element affixed to said second element by set screws adapted to be loosened to allow adjustment between said second and third elements in a plane transverse to the holder axis; and a shank on said third element adapted to fit in a machine socket to support said holder.

References Cited by the Examiner
UNITED STATES PATENTS

| | | | |
|---|---|---|---|
| 1,222,266 | 4/17 | Railton | 279—16 |
| 2,547,522 | 4/51 | Eichelman | 279—16 |
| 2,767,564 | 10/56 | Green | 279—16 |
| 2,867,440 | 1/59 | McLaughlin | 279—16 |

ROBERT C. RIORDON, *Primary Examiner.*

FRANK SUSKO, *Examiner.*